May 7, 1963 G. M. SHERMAN 3,088,375

RAMMER HEAD HOISTING APPARATUS

Filed March 2, 1962

10 Sheets-Sheet 1

INVENTOR.
GEORGE M. SHERMAN
BY
ATTORNEYS

May 7, 1963 G. M. SHERMAN 3,088,375

RAMMER HEAD HOISTING APPARATUS

Filed March 2, 1962 10 Sheets-Sheet 2

INVENTOR.
GEORGE M. SHERMAN

BY

ATTORNEYS

INVENTOR.
GEORGE M. SHERMAN
BY
ATTORNEYS

May 7, 1963 G. M. SHERMAN 3,088,375

RAMMER HEAD HOISTING APPARATUS

Filed March 2, 1962 10 Sheets-Sheet 4

INVENTOR.
GEORGE M. SHERMAN

BY

ATTORNEYS

May 7, 1963 G. M. SHERMAN 3,088,375

RAMMER HEAD HOISTING APPARATUS

Filed March 2, 1962

10 Sheets-Sheet 5

INVENTOR.
GEORGE M. SHERMAN
BY

ATTORNEYS

May 7, 1963 G. M. SHERMAN 3,088,375

RAMMER HEAD HOISTING APPARATUS

Filed March 2, 1962 10 Sheets-Sheet 6

INVENTOR.
GEORGE M. SHERMAN

BY

[signature]
ATTORNEYS

May 7, 1963 G. M. SHERMAN 3,088,375

RAMMER HEAD HOISTING APPARATUS

Filed March 2, 1962

10 Sheets-Sheet 7

INVENTOR.
GEORGE M. SHERMAN
BY
Paul W. Critchlow
ATTORNEYS

May 7, 1963 G. M. SHERMAN 3,088,375
RAMMER HEAD HOISTING APPARATUS
Filed March 2, 1962
10 Sheets-Sheet 8

INVENTOR.
GEORGE M. SHERMAN
BY
Paul W. Gilchen
ATTORNEYS

May 7, 1963

G. M. SHERMAN 3,088,375

RAMMER HEAD HOISTING APPARATUS

Filed March 2, 1962

10 Sheets-Sheet 9

INVENTOR.
GEORGE M. SHERMAN

BY

[signature]
ATTORNEYS

May 7, 1963 G. M. SHERMAN 3,088,375

RAMMER HEAD HOISTING APPARATUS

Filed March 2, 1962

10 Sheets-Sheet 10

INVENTOR.
GEORGE M. SHERMAN

BY

ATTORNEYS

United States Patent Office 3,088,375
Patented May 7, 1963

3,088,375
RAMMER HEAD HOISTING APPARATUS

George M. Sherman, Bremerton, Wash., assignor to the United States of America as represented by the Secretary of the Navy Filed Mar. 2, 1962, Ser. No. 177,713
14 Claims. (Cl. 89—1.7)
(Granted under Title 35, U.S. Code (1952), sec. 266)

The invention described herein may be manufactured and used by or for the Government of the United States of America for governmental purposes without the payment of any royalties thereon or therefor.

The present invention relates to a hoisting apparatus and more particularly to an apparatus for hoisting guided missiles from a stowed position in a magazine into a firing position on a launcher arm.

Missile launching systems, particularly those adapted for a shipboard launching operation, customarily employ launcher arms usually provided with missile-supporting rails extending along their face portions. The missiles themselves are rather slender, long, cylindrical objects provided with forward and rearward (forward and aft) lugs or shoes adapted to be engaged by the rails, these lugs also riding freely through the rails to permit an initial ramming of the missile into a rail-supported position.

Prior to a launching operation, the missiles are stowed or carried in suitable magazines which should permit the carrying of a maximum number of missiles and, at the same time, permit maximum speed and safety in transferring or moving the selected missiles onto the launcher arm. Obviously, to reduce the loading and firing time, the path of travel from the magazine to the launching position should be kept at a minimum. Safety also is a major consideration and the safety factors must take into account the possibilities of shock, vibration, weather conditions and other disrupting conditions to which the ship and its launching system will be subjected.

One launching system which has proved quite satisfactory employs a stationary magazine having a plurality of missile-carrying cells arranged in two concentric rings, the missiles being supported and locked in a tail-down, vertical position in the cells by a particular support and latch mechanism which forms a part of a copending application, Serial No. 176,882 filed February 28, 1962, now U.S. Patent No. 3,065,673. The top of the magazine is closed by a rotatable cover having special missile blast doors adapted to be rotatably indexed into alignment with the selected missile cell, the doors then rotating into an open position to permit loading access.

The system further includes a rotatable turret mounted directly on the axis of rotation of the magazine cover and provided with a pair of launcher arms commonly referred to as guide arms. Each arm, in addition to rotating in train with the turrets can be elevated from a horizontal to a vertical position.

In a loading operation, the missile is moved from the magazine cells onto one or both of the launcher guide arms for firing, and, to facilitate this transfer, the magazine carries rails similar to those carried by the launcher arms. The launcher arms are rotated to align their rails with the magazine rails to provide a continuous track through which the shoes or lugs of the missiles can travel as they are moved or rammed into firing position on the arms.

Accordingly, one of the objects of the invention is to provide a means for expeditiously and safely ramming or hoisting a vertically-disposed, stowed missile in a vertical direction onto a launcher arm guide rail.

Another object is to provide a hoisting mechanism capable of moving missiles to and from a vertically-disposed stowed position.

Still another object is to provide a hoisting mechanism capable of engaging a missile lug for either a loading or unloading operation, the engagement being remotely releasable so as to permit a disengagement interiorly of the magazine.

A more specific object related to the last-mentioned one is to utilize a driven rammer head capable of being extended from the launcher arm into the magazine for an automatic hoisting engagement with a missile lug or shoe.

Another similar object is to remotely and selectively control the engagement of the rammer head either to cause it to engage a missile or to prevent its automatic engagement so as to permit the rammer head to be withdrawn from the magazine without carrying a missile with it.

Yet another closely-related object is to control the engagement of the rammer head in response to the rammer head drive.

A further general object is to accomplish the desired hoisting function with substantial safety factors that contemplate disruption of normal operation due to shock, vibration and other similar effects. More specifically, this object contemplates disruption of shipboard hydraulic power supply and its accomplishment features the provision of a mechanical drive by means of which the loading operation can be manually performed.

Other objects and many of the provisions of the invention will become apparent in the ensuing detailed description.

The preferred embodiment of the invention is illustrated in the accompanying drawing of which FIG. 1 is a somewhat schematic perspective view of the upper part of a launcher system apparatus in which the present invention may be used;

Figure 1:
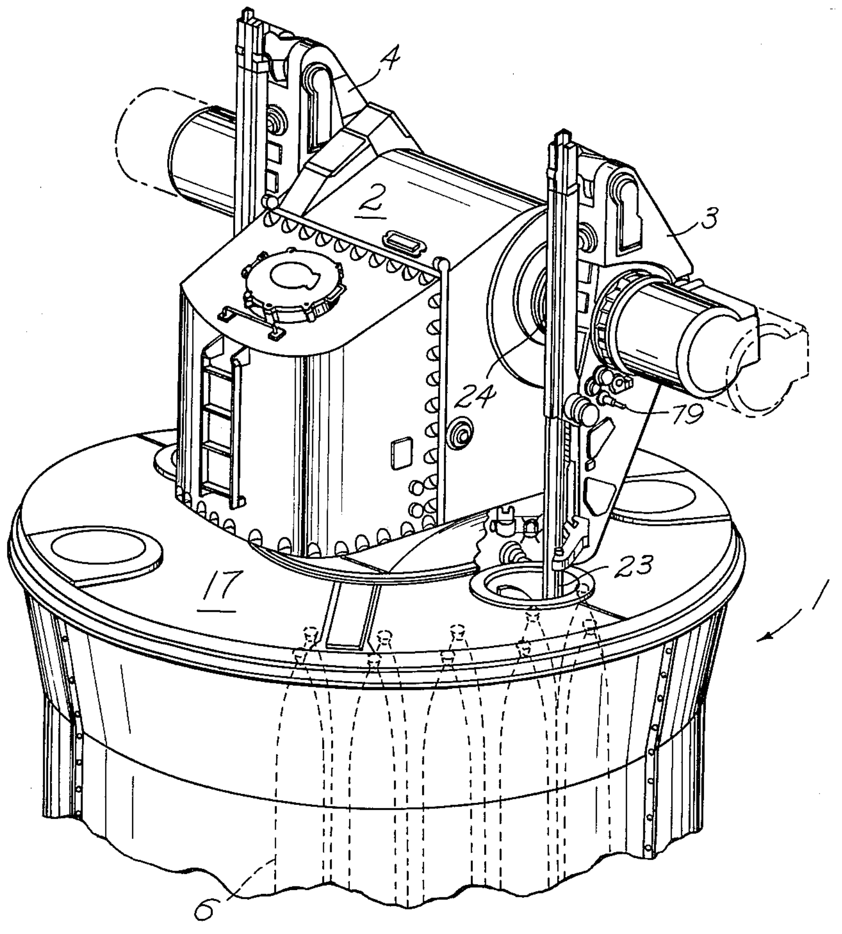

The launching system shown in the drawings includes several major components identified as a magazine 1, a turret 2, and launcher guide arms 3 and 4, these arms being identical in all pertinent respects so that a description of one will suffice for both.

Magazine 1 is a large, cylindrical structure adapted to be mounted in a deck 5, the magazine carrying a plurality of supersonic, surface-to-air antiaircraft missiles 6 in a concentric ring arrangement. The missiles are carried vertically in a tail-down position and, as may be noted in FIG. 3, the interior of the magazine is formed with a number of individual cells 8 for receiving each missile.

Figure 3:
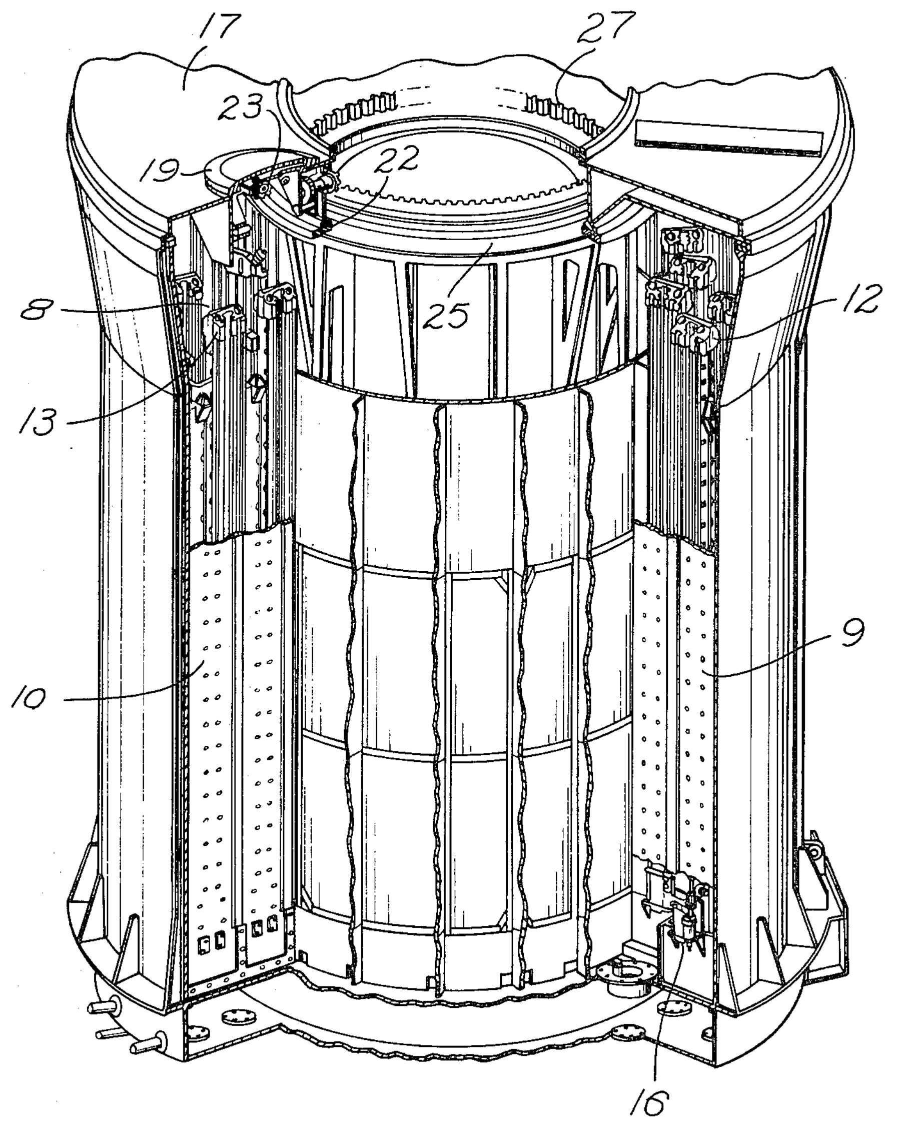
FIG. 3 is a perspective view of the missile magazine in which a front section has been broken away to show the interior cell structure of the magazine and its pertinent components.
Figure 4:
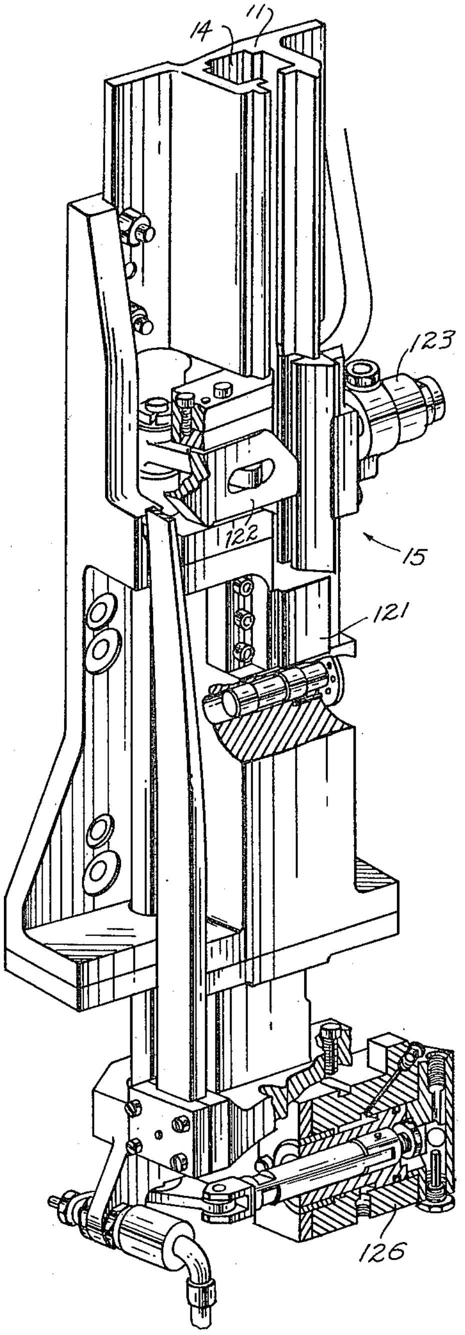
FIG. 4 is a schematic, partially-broken and sectioned perspective of a latch assembly of the magazine.

Considering further the structure illustrated in FIG. 3, cells 8 are formed of partition walls 9 and 10, each of which carries a rail section 11 and 12 formed to receive missile shoes or lugs 13 (FIG. 10) which, as will be understood, are carried in diametrically opposite positions on the after portion of the missile. In addition to being shaped to receive lugs 13, the rails, as best seen in FIG. 4, also are provided with a so-called rammer chamber portion 14 which receives a rammer head section of a particular hoisting mechanism to be described.

Support for the missiles in the cells is provided by a rail support and latch assembly 15 (FIG. 4) and a rail support and buffer assembly 16 (FIG. 5), assembly 15 being disposed at the bottom portion of one of the cell rails (rail 11), and the other assembly 16 being disposed in substantially a diametrically opposite disposition at the base of the opposite cell rail (rail 12). Certain details of these two assemblies have present functional significance and will be discussed later. For the present it will be sufficient to note that the latch assembly engages as well as supports after lug 13 in the missile, while the buffer assembly, in addition to providing further support, cushions the missile as it is lowered into its stowed position.

At its top, the magazine is closed by a rotatable magazine cover 17 provided with inner and outer blast doors 18 and 19, the cover being rotatably driven about a vertical central axis of the magazine by a meshed engagement of a driven pinion (not shown) with a ring gear 22.

After the magazine cover has been rotatably indexed to locate a desired pair of blast doors over the missiles to be loaded, the blast doors rotate about a horizontal axis into an open position (FIG. 1) and, in this position, rails 23, carried interiorly of the doors mate with one or the other of the set of magazine rails to form a continuous path through which the missile lug and the hoisting mechanism can freely travel. The blast doors can be rotated clockwise or counter clockwise to mate their rails with either of rail sections 11 or 12 of a missile cell.

Previously-mentioned rotatable or trainable turret 2 is disposed directly above the magazine and, as may be noted in FIG. 1, the turret is provided with suitable bearings for receiving a horizontally-disposed torque tube 24 which mounts launcher arms 3 and 4. Also, in the manner shown in FIG. 3 turret 2 is carried by a stationary stand 25 and its rotary drive is provided by a driven pinion meshed with a stationary ring gear 27. The axis of rotation of the turret coincides with that of the magazine cover so that launcher arms 3 and 4 can be carried into positions in which they are disposed directly over a pair of blast doors 18 or 19. As another matter of interest, the launcher arms are so mounted on torque tube 24 that each can be extended or retracted to position the arms over either inner doors 18 or outer doors 19. When the launcher arms are positioned over the selected blast doors, they may be elevated into a vertical position to permit the launcher arm loading or hoisting operation.

Figure 2:
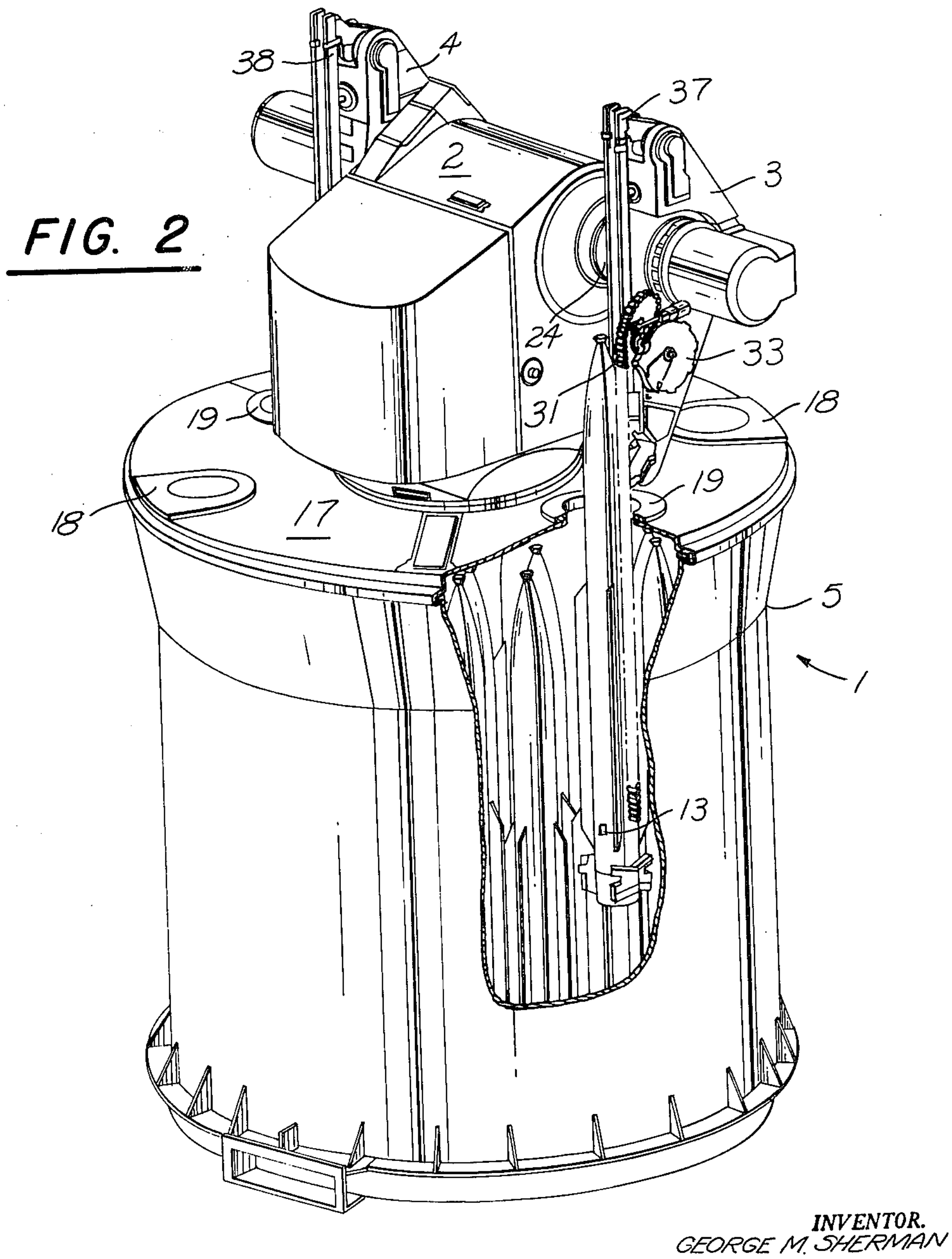
FIG. 2 is a fragmentary view showing a launcher arm of the FIG. 1 apparatus in the act of hoisting a missile onto a guide arm.
Figure 6:
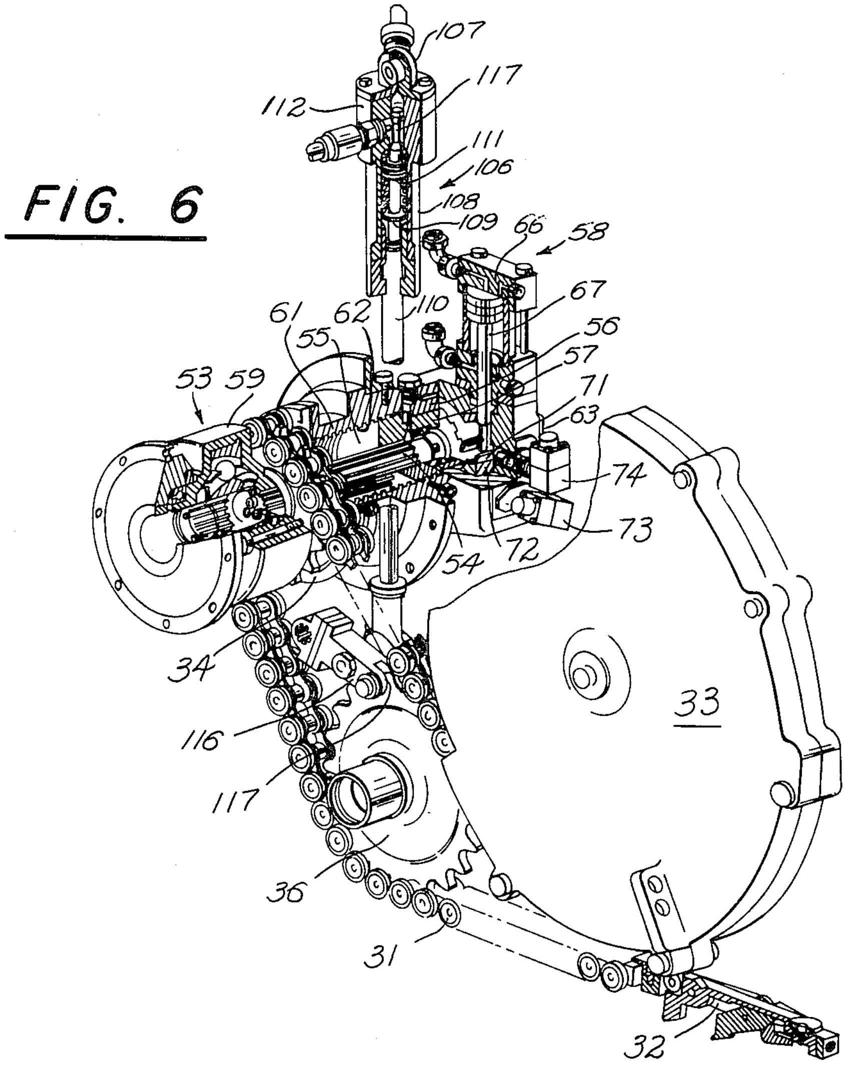
FIG. 6 is an enlarged, partially-sectioned perspective of a rammer and rammer drive of the invention.

The more significant features of the present invention are concerned primarily with the missile hoisting mechanism which is mounted on the launcher arms, the mechanisms on both arms being essentially identical so that a description of one will suffice for both. Generally considered, the hoisting mechanism includes a chain 31 having at its free end a so-called rammer head 32 ( FIG. 6) which, esentially, is a latch adapted to engage a missile lug or shoe and permit the hoisting of the missile. As seen in FIGS. 2 and 6, chain 31 has its major portion reeled in a chain magazine 33. In leaving the magazine, the chain passes over a rammer drive sprocket 34, a rammer idler sprocket 36 and into the rail of its launcher arm, it being noted that each arm mounts a rail section 37 and 38 similar in configuration to magazine rails 11 and 12 to the extent that the rails are adapted to freely receive a missile lug as well as the chain and rammer head 32. In the actual construction of the particular launcher arms used in this system, the rails are provided in three sections, these being forward, center and after sections. Each of the sections, of course, is adapted to receive the missile lugs so that the missile can be rammed the whole way onto the launcher arm. However, as will be appreciated, only the after section need provide additional accommodation for rammer head 32 and the chain.

Functionaly considering the apparatus so far described, it will be noted that arrangement is one in which launcher arms 3 and 4 can be rotated by turret 2 to position the arms directly over the selected magazines, following which, launcher arm rails 37 and 38 can mate with rail section 23 on the magazine blast doors to provide a continuous track or path of travel for the missile from the magazine into a rammed position on the launcher arm. With the components so aligned, chain 33 is driven to extend rammer head 32 downwardly into the magazine, the rammer head, of course, travelling in its rail chamber 14. At the maximum extent of its travel, rammer head 32 engages missile shoes 13 in a particular manner to be described so that a reverse drive of the chain results in hoisting the missile vertically from the magazine onto the rail. Features of the invention which will be considered separately are a particular chain drive, a rammer head brake and the structure of rammer head 32 which permits the missile in the magazine to be first freed from the missile latch and next to be engaged by the rammer head for hoisting purposes.

Before continuing with a detailed consideration of these features it would be well to consider several different modes of operation which the launcher must satisfy. Primarily, of course, the hoisting mechanism is used to engage and rame the missiles onto the launcher arm. However, it sometimes is necessary for the rammer head to be retracted from its extension into the magazine without engaging and hoisting the missile. For example, in a so-called "exercise" operation in which shipboard personnel practice and become familiar with their particular responsibilities, it is unnecessary to actually engage and ram a missile onto a launcher arm. In these instances, there is an option of extending and retracting the rammer without the missile. In another mode of operation, missiles are loaded from a transfer car onto a launcher arm and then into a stowed position in the missile magazine. In this latter operation, the hoisting mechanism of the launcher arm is in effect loading the magazine with the missiles to the extent that a missile is deposited in each of the cells. Obviously, the missile is controlled by the mechanism during its descent into the cell, and it then is necessary to retract the chain without again bringing up the missile.

To conduct these operations, the rammer chain drive cooperates with the particular rammer head arrangement to selectively leave or pick up the missile. First considering the arrangement of rammer head 32, it may be noted in FIGS. 8 and 9 that the rammer head is formed of an essentially bar shaped body 38 fitted with a finger 39, a pawl 40, a spring loaded cam 41, a buffer 42, side rollers 43, and alignment rollers 44, the finger and pawl constituting a latching arrangement which engages and secures the rammer head to the missile and launching shoe. Finger 39 is pivoted in a cut-out in the center of the rammer head body and is formed at its upper end to engage the aft missile launching shoe in a manner to be described. On its back side, the finger may have a roller or arcuate roller surface 46. Pawl 40 also is pivoted in a cut-out in the center of rammer head body 38 and it receives a spring load through cam 41. To obtain the spring load, springs 47 are received in and guided by a recess or bore formed in the cam, these springs bearing at their other ends against the rammer body.

A particularly important feature of the cam and pawl arrangement is that it has an over-center throw to the extent that the pawl normally is held in an outwardly projecting position by the cam but, upon adequate depression, the cam snaps beneath it to restrain and maintain the pawl in its depressed disposition within the body of the rammer head so that, upon the return stroke of the chain, the rammer head will not engage and pick up a missile. The operation of the rammer head finger and pawl as well as other structural features, will be described in further detail with reference to schematic FIGURES 10–19. Obviously, it is desirable to maintain the pawl in its depressed position during the previously-described exercising operation or during magazine-loading.

Generally, the over-center throw of the pawl is achieved by causing the chain drive to produce a so-called long stroke as opposed to the normal stroke or extension of the rammer head downwardly into the magazine. When the rammer head is driven in its long stroke, its pawl strikes a particular cam to be described which is disposed below the normal level of the shorter stroke and this cam is so shaped and carried in the magazine cell as to snap the pawl over its pivotal center.

The mechanism for producing the long and short chain strokes is best understood with reference to FIG. 6, although it first should be noted that motive power for rammer drive sprocket 34 may be supplied in a conventional manner by a hydraulic motor (not shown) which should have suitable arrangements to vary the speed and direction of the chain movements. Customarily, the motor will include various regulator valves and drive response mechanisms which provide for fast or slow movement, as well as permitting deceleration as the rammer head approaches critical positions.

The illustrated mechanism for producing the long and short stroke forms the subject matter of a related patent application, Serial Number 176,883, filed February 28, 1962, entitled, "Rotary Drive Control Mechanism." However, the present description should be in sufficient detail for an adequate understanding. It will be apparent that other means for producing a long and short stroke can be employed. One such other means is illustrated and described in another copending patent application of Kongelbeck, Serial No. 819,517, filed June 10, 1959, entitled, "Turret Launcher."

The principal elements of the present mechanism include a universal joint 53, a timing shaft 54, a timing screw 55 splined to the timing shaft, a torque stop 56, a clutch stop 57 and a stroke cylinder 58, the last being hydraulically controlled from a remote position to selectively produce either the long or short stroke. Universal joint 53 couples the drive shaft 50 of the rammer drive mechanism to drive sprocket 34, and, as seen, the joint is a conventional type secured in a bell housing 59. Timing shaft 54 is secured and internally splined to a stub shaft on the bell housing and it also rotates with the housing and the sprocket. Timing screw 55 is, as already stated, internally splined to the timing shaft and, as may be noted, it is mounted in a timing shaft housing 61 which is provided with internal threads 62 to receive threads formed externally on the timing screw. In the apparent manner, rotation of the timing shaft causes timing screw to advance or retract within its housing. Further, external face of timing screw 55 is formed as a fixed half of a jaw clutch which, in turn, is adapted to engage with clutch stop 57 also provided with a detented surface forming the other half of the jaw clutch. Torque stop 56 is a hub supported on a shoulder in the timing shaft housing under an end plate 63, and, as will be noted, it is provided with an internally-splined center bore that mates with an external spline on clutch stop 57. In turn, the clutch stop is disposed within the torque stop and it also is provided with a center bore mounted on roller bearings on the end of timing shaft 54 to allow the timing shaft to be rotated independently of the stop until its timing screw engages the stop by means of the jaw clutch arrangement previously mentioned.

Stroke control cylinder 58 is a mechanism employed to provide the remote control by which the rammer head stroke can be varied. The mechanism includes a cylinder 66, a hydraulically-operated piston 67, extend and retract hydraulic ports and appropriate hydraulic seals. It is mounted on the timing shaft housing with its piston 67 extending downwardly through a bore provided in the housing to engage a roll spring 71. The roll spring, in turn, is mounted on a flanged portion 72 of the torque stop, the flange having a curved surface receiving the spring. Consequently, extension of piston 67 causes torque stop 56 to rotate because of the torque-stop-to-piston-rod connection through the roll spring, and this rotation advances the jaws on the clutch stop 57. Obviously, when the jaws are so advanced, the engagement of the jaw clutch occurs after a lesser travel of the timing screw has been achieved so as to produce a shorter stroke than otherwise would be produced if the timing screw were permitted to advance its full length. To provide for remote control and indications, the mechanism further includes a pair of switches 73, 74 also operated by roll spring 61, these particular switches being interlock switches to control relays that affect other launcher operations.

Summarizing the operation of this rammer head control mechanism, a short or long stroke of the rammer head is produced by extending or retracting stroke control cylinder 67. By means of the piston-to-torque stop connection accomplished through roll spring 71, the torque stop and its splined clutch stop may be rotated to position the clutch stop jaws so that the advancing jaws of the timing screw will engage at a different degree of timing screw advance. Roll spring device 71 permits switch actuation in conjunction with the setting of the mechanism for a long or short stroke. In addition to the remote control provided by the stroke control cylinder, it, of course, is possible to initially set the stroke at various degrees of extension. To accomplish this, end plate 63 is provided with a cover which may be removed to provide access to an adjusting screw. Rotation of this screw advances clutch stop 57 to initially adjust the stroke to the desired degree. Another setting rendered possible by this arrangement is that of advancing or retracting the timing screw itself along its splines.

Other features of the invention are concerned with the braking and latching of the rammer head drive, these features also contemplating the possibility of hydraulic failure so as to permit emergency manual operation if needed.

Figure 7:
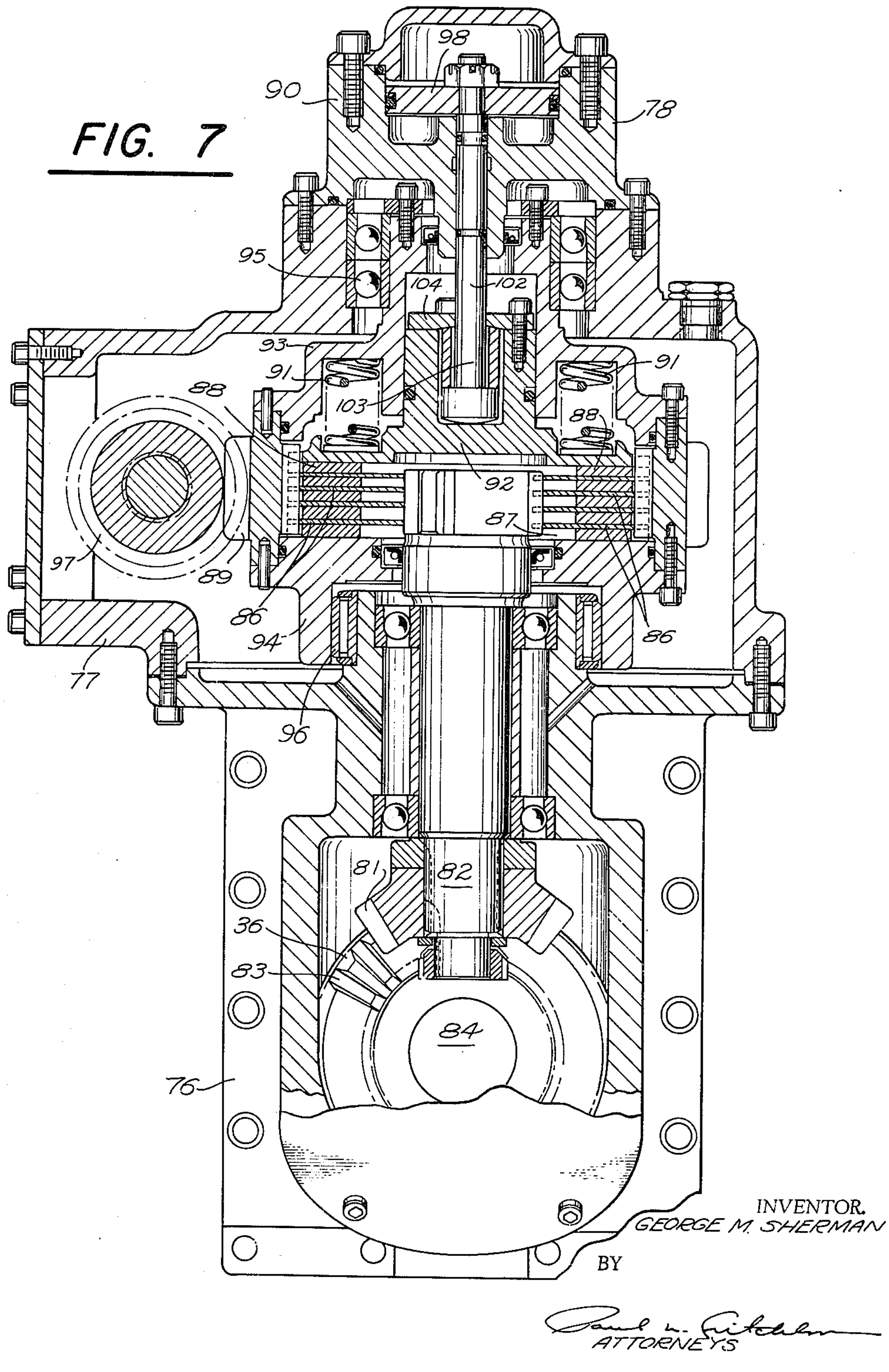
FIG. 7 is a sectioned elevation of a rammer brake.

The rammer brake is somewhat diagrammatically illustrated in FIG. 7 in which it first may be noted that the brake componnets are mounted in three separate housings, these being identified as a lower housing 76, center housing 77 and upper housing 78; lower housing 76 being the support member for the brake and being flanged for attachment to the inboard side of the guide arm structure. The brake is a spring-loaded friction disk clutch that acts as a brake for the rammer head and chain through rammer head idler sprocket 36. However, an equally important function of the brake is its ability to act as a clutch between a manual drive arm 79 (FIG. 1) and idler sprocket 36. Also, the brake is operated by hydraulic fluid controlled by a solenoid valve (not shown), this operation and control of the brake being quite conventional.

Referring particularly to FIG. 7, it will be seen that lower housing 76 supports the brake in position to mesh a drive gear 81 (mounted on a brake shaft 82) with a beveled gear 83 which is carried by rammer idler sprocket shaft 84. Drive shaft 82 of the brake extends through a reduced diameter portion of the lower housing in which the shaft is roller mounted for free rotation, the shaft terminating in center housing 77 where it mounts four clutch inner discs 86 in integral keys formed in a shoulder 87. Braking and clutching action is provided by a frictional engagement of inner discs 86 with four outer discs 88 internally splined to a worm gear 89. Pressure for producing the frictional disc engagement is provided by eight coil springs 91, two of which are seen in FIG. 7, and, as will there be noted, the springs are mounted between shoulders provided by the upper surface of a face-plate 92 and the lower surface of an upper disc housing 93. Upper disc housing 93 as well as a lower disc housing 94 both are fastened and sealed to worm gear 89 so that rotation of the worm gear carries the housings with it. To permit rotation, the upper disc housing is provided with roller bearings 95, while the lower disc housing has needle bearings 96.

Worm gear 89 is meshed with a manual drive worm 97 which, in turn, is coupled through universal joint connections (not shown) to rammer manual drive shaft 79 that projects from the outboard side of the launcher arm. Shaft 79, therefore, is capable of rotating the worm and worm gear 89 to transmit the manual rotation to brake shaft 82 and idler sprocket 36, the obvious purpose being to permit manual control of rammer head drive. Normally, inner and outer discs 86 and 88 do not produce the clutching action need for manual drive. Clutching action, however, is obtained automatically on a hydraulic power failure or, of desired, it can be employed selectively.

Brake release cylinder 90 is mounted in upper housing 78. It includes a brake release piston 98, as well as a hydraulic supply port 99 and a drain port 101. Piston 98 is drilled and tapped at its center to receive a connecting rod 102, this rod passing through the upper brake housing and being secured to previously mentioned spring-loaded face plate 92 by a sleeve bearing 103 and a retainer 104. Functionally, when hydraulic fluid is delivered to brake release cylinder 97, piston 98 moves upwardly and to compress springs 91 sufficiently to release the braking pressure on the inner and outer discs. Upper housing 78, as well as other parts are provided with the usual oil seals and lubricating accessories to permit free rotation of the brake shaft and its driving components within the stationary members.

In operation, the braking load of the brake shaft is transmitted to the friction contact of the inner and outer disc when hydraulic pressure is relieved. In this regard, bevel gear 81, mounted on the lower end of brake shaft is a 21-tooth gear which meshes with a 30-tooth bevel gear 83 on the idler sprocket shaft for a speed reduction of approximately 1.43 to 1. Manual drive of the idler sprocket is obtained upon release of pressure to the brake release cylinder, this release permitting springs 91 to exert their full force upon the frictional contact of the discs to create a clutch through which worm gear 91 then can drive the idler sprocket.

Another important adjunct primarily operable in a power failure situation is a rammer latch, generally indicated by numeral 106. This latch is illustrated somewhat schematically in FIG. 6, in which it may be noted that the upper portion of the latch has a flanged section 107 by means of which the latch can be bolted to the launcher guide arm with which it is to be used. The principal components of the latch include a latch cylinder 108 interiorly fitted with a piston 109 that is machined to provide a seat for spring 111. The other seat for spring 111 is provided in a piston head portion 112. Coupled to piston 109 is a connecting rod 110 which extends downwardly out of cylinder 108, the connecting rod terminating in a spherical bearing rod end which is coupled to a power failure latch link arm 116. The latch arm, in turn, is formed with a clevis 117 in which is mounted a latching rod which, when connecting rod 110 is forced downwardly, engages the teeth of the idler sprocket to prevent its rotation. The link itself is pivotally coupled at its rear end to the launcher guide arm. In operation, hydraulic fluid entering the latch cylinder forces the piston upwardly to compress the spring and maintain the latch in a released position. In the event of hydraulic failure, no hydraulic pressure is available at the latched cylinder and the spring is released to extend the piston and cause the latch link arm to engage the idler sprocket and stop the chain. It also will be noted that piston 109 connects to an upwardly projecting rod 117 which is a switch actuating arm adapted to open and close contacts to permit a desired sequence of actions when there is a power failure. Again, the particular interlocks and relays of the system as a whole are not of present concern and it is sufficient to note that the latch is provided with means through which the system can be adjusted upon power failure.

*Operation*

Operation of several of the components already has been individually described. The present section is more concerned with promoting a clear understanding of the manner in which the rammer head selectively engages or disengages a missile shoe to either load the launcher arm or permit a missile to be stowed in the magazine. However, before a clear understanding of this operation can be obtained, it will be necessary to consider the particular manner in which the missiles are stowed and latched in the magazine. As has already been noted, each cell of the magazine is provided with a pair of rails, one of the rails being on one side of the cell and the other in a juxtaposed or confronting position on the other side. The missiles, in turn, are provided with launching shoes which ride in each of the rails when the missile is lowered into or raised from the cell. It further has been noted that one of these rails, rail 11, has a rail support and latch assembly 14 and mounted at its lower end, while the other rail, rail 12, has a rail support and buffer assembly at its lower end. A full description of these assemblies is contained in co-pending patent application, Ser. No. 176,882, filed Feb. 28, 1962, now U.S. Patent No. 3,065,673, entitled: Missile Stowing Apparatus, and, for the present, it will be sufficient to note only certain functional aspects.

Figure 5:
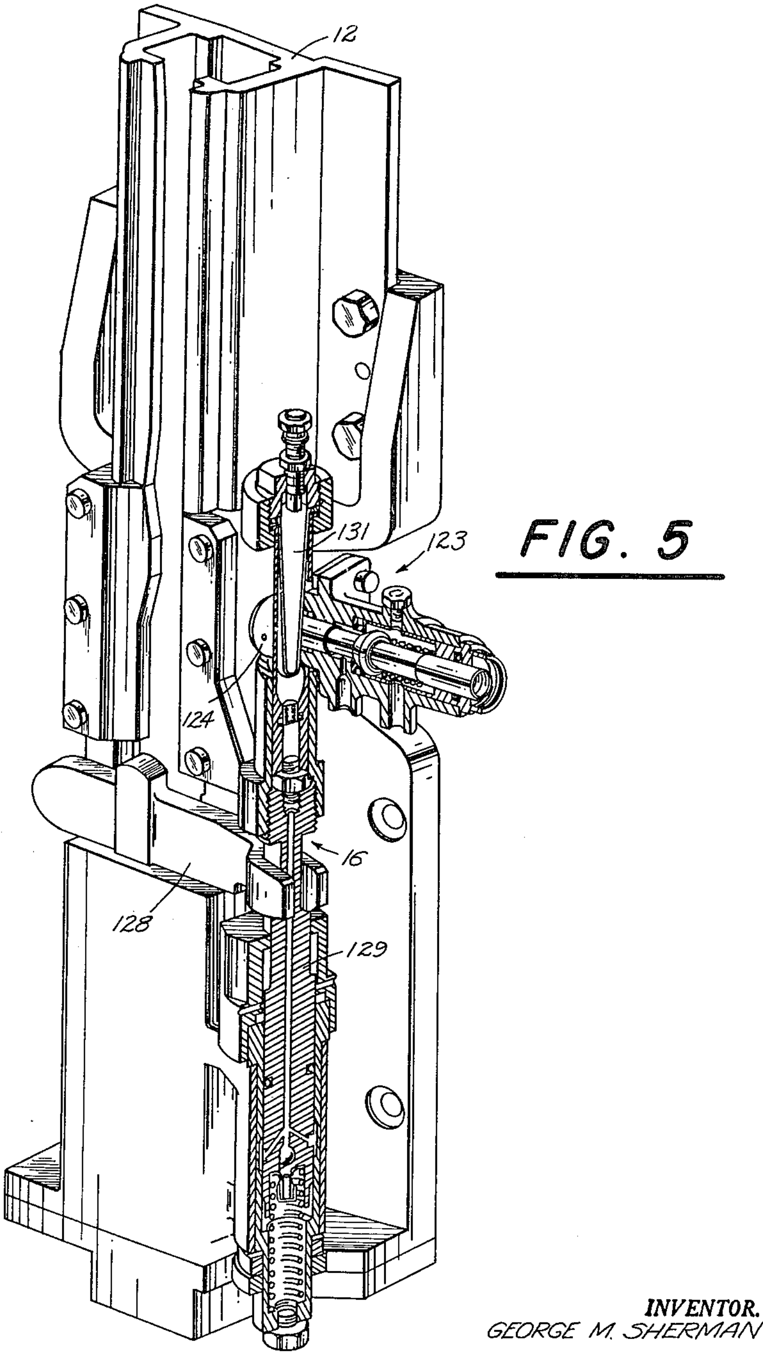
FIG. 5 is a perspective, partially-sectioned view of a buffer assembly of the magazine.

For example, rail support and latch assembly 14 is, as indicated by the title, a mechanism for both supporting and latching the missile, the portion of the missile so supported and latched being the after missile shoe lug identified by numeral 13. Referring to FIG. 4, it will be seen that support for the after shoe is provided by a lug support block 121 mounted at the lower termination of the missile rail 11. When the missile is so supported, a latch 122 is capable of riding over the shoe to secure the missile in its stowed position. Consequently, as will be appreciated, it is essential for the hoisting apparatus first to disengage the latch before the missile can be raised out of the magazine, this being accomplished by employing a hydraulically controlled latch. Control is provided by a latch cylinder control valve 123 which has a cam portion 124 projecting into the path of rammer head 32 as it moves downwardly in rammer chamber 14 (FIG. 5). When the rammer head strikes the cam, it operates the valve which, in turn, directs a supply of hydraulic pressure to a latch operating cylinder 126. The piston of cylinder 126 is linked in the manner shown to a latch arm that engages the latch to retract and permit the rammer head to latch the missile by the after shoe.

Another important factor to be noted is that a similar latch control valve 123 is mounted at the base portion of the juxtaposed rail 12, this being the rail that also mounts the missile buffer mechanism. Consequently, the missile latch can be controlled regardless of which rail the hammer head is introduced into. In this regard, it is interesting to note that, if the rammer head of one of the launcher arms is introduced into a magazine cell, it must be introduced from one side or the other of the cell depending upon whether the cell is on the left or right side of the launcher as a whole.

The buffer mechanism shown in FIG. 5 is of no present concern since its primary function is to ease or cushion the missile as it is dropped into its stowed position. Briefly, it mounts a pivotal arm 128 at the bottom of its rail section, this arm being struck by the missile shoe in descent and the resulting pivotal movement of the arm actuating the buffer mechanism which, in general, includes a buffer piston 129 and a buffer accumulator 131.

The more important aspects of the magazine are those which are illustrated in schematic FIGURES 10–19 with reference to which the major functions of the rammer head now will be described.

First, assuming that it is desired to hoist a missile from its stowed and latched position in the magazine onto a launcher arm, the launcher arm is rotated by the launcher turret into a position in which its rail is directly over the magazine rail of the cell containing the missile to be picked up (FIGS. 1 and 2). Also, the launcher arm is elevated to a vertical position to bring its rail in line with the cell rail to permit the formation of a continuous rail for the missile shoe. At the same time, the magazine cover is rotated into a position in which one of the blast doors lies directly over the selected missile cell and the blast door then is opened to mate its inner rail with the rails of the launcher arm and the magazine. Special latching arrangements may be utilized for this mating purpose, but these arrangements are not a part of the present novelty.

The operation of extending the rammer head into the missile commences with a setting of the rammer drive to produce a short stroke. The B-end motor of the rammer drive is energized to drive the rammer head drive sprocket in a direction capable of extending the chain and the rammer head through the bottom portion of the launcher arm rail and into the missile cell itself.

Figure 10:
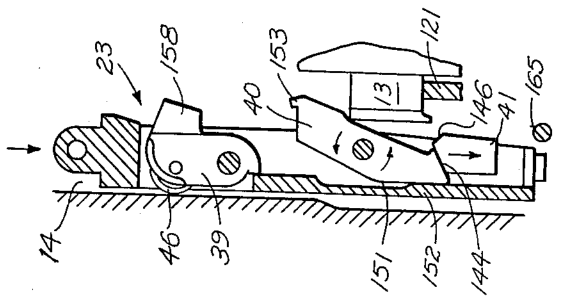

FIGS. 10–16 illustrate the various actions that take place to enable the rammer head to engage and lift the missile. First it will be recalled that the rammer head includes a pivotal finger 39 and a pivotal pawl 40, the latter normally being urged in an extended direction by a spring loaded cam 41. FIG. 10 shows the rammer head proceeding downwardly in a magazine cell through its rammer head chamber 14, and the illustrated action is that which is taking place after the buffer of the rammer head has struck cam 124 of latch control cylinder 123 to cause a hydraulic release of the latch. The schematic drawings therefore do not show a missile latch since it has been hydraulically moved free from its engagement.

Also, the schematics do not show certain other elements of the rammer head which are functual during the missile loading and unloading. For example, referring again to FIGS. 8 and 9, it has been noted that the head mounts side rollers 43 and alignment rollers 44, the side rollers being support members carried on pins by bearing-type bushings on each side of the head. Alignment rollers 44 basically serve to centralize the head in its travel through chamber 14. Further, buffer 42 carried at the end of the head is a striker plate providing surface for contacting latch control valves 123 of the missile latch release or pivotal arm 128 of the missile buffer. This contact, most suitably, is arranged so that the actual engagement of buffer 42 occurs a set distance from the end of the rammer extend stroke. The buffer presents a metal-to-metal contact in the event of rammer chain failure.

Figure 8:
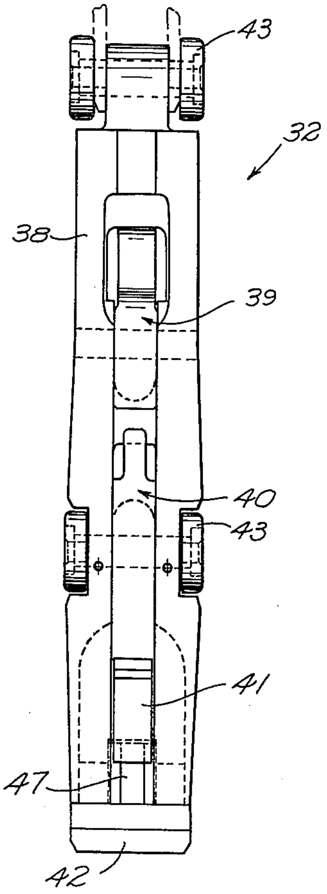
FIG. 8 is a plan view of the rammer head.
Figure 9:
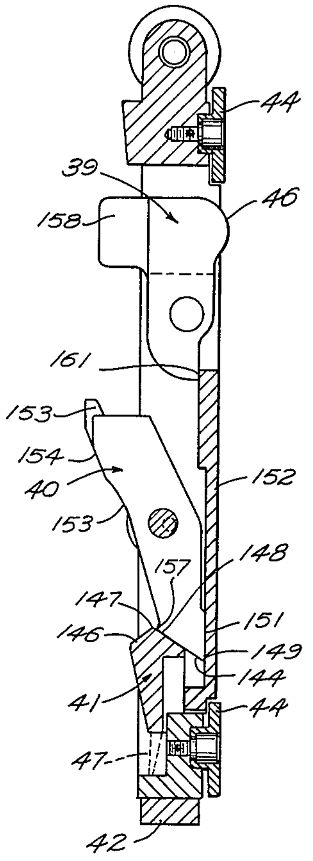
FIG. 9 is a section along lines 9—9 of FIG. 8.

In addition, the preferred construction and design of the rammer head components is as shown in FIGS. 8 and 9, it being recognized that the schematic showings have been simplified for illustrative purposes. Considering some of these details, it is to be noted that cam 41 has a wedge-shaped camming surface formed by beveled surfaces 144 and 146 which converge in an edge portion 147. As shown in FIG. 10, surface 144 is holding pawl 40 in its depressed condition. Further, to permit the depression, pawl 40 has a co-acting beveled surface 148 also terminating in an over-center edge 149. The rear surface of the pawl has a flat section 151 normally pressed against the pawl's rear plate 152, while the upper portion of this rear surface is cut-away and curved to permit the pivotal movement produced as the pawl is depressed.

The top surface of pawl 40 also is functionally shaped for purposes that will become apparent. At its upper end it is formed with a detent or hook portion 153 adapted to engage missile shoe 13. Contiguous to detent 153 is a flat section 154 and then a depressed section 156, while at the extreme lower end of its upper surface, the pawl is formed with a projection or ridge 157 that then leads into beveled surface 148. As seen in FIG. 9, when rear surface 151 contacts rear plate 152, the pawl's depressed section is inclined outwardly so that it can be cam-engaged and depressed rearwardly as the rammer moves.

Finger 39 is essentially a pivotal latch having a dog projection 158 that can be swung over the missile shoe to cooperate with pawl detent 153 in engaging the shoe. It further carries previously-mentioned roller 46 at its upper rear surface, while its lower surface is extended sufficiently to provide a stop flange 161 that engages rear plate 152 to limit the pivotal movement. When the missile is fired from the launcher arm, finger 39 is pivoted out of the way, However, the arms mount a special fire-through-latch which again cocks the finger as the rammer head again extends to pick up another missile. This detail of the operation is not illustrated and is not required for an understanding of the present invention.

Returning to the functional description as illustrated in the schematic drawings, FIG. 10 shows rammer head moving downwardly to engage a missile shoe that is resting upon supporting block 121 of the rail support and latch assembly. Outwardly projecting pawl 40 is shown as it first contacts the missile shoe.

Figure 14:
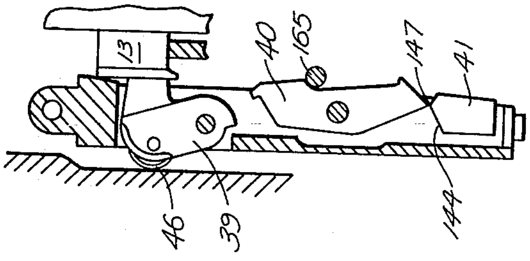
FIGS. 10–16 are schematic elevational views illustrating the rammer head's missile lug latching action as it picks up a missile.
Figure 13:
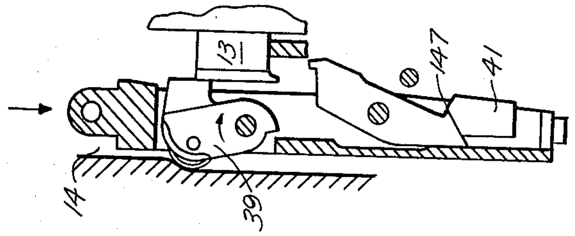
Figure 12:
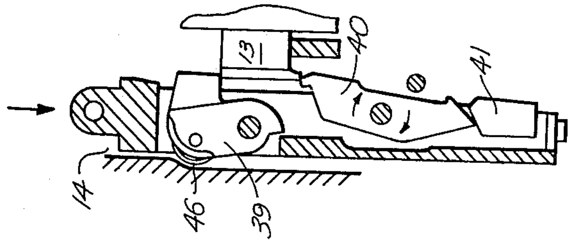
Figure 11:
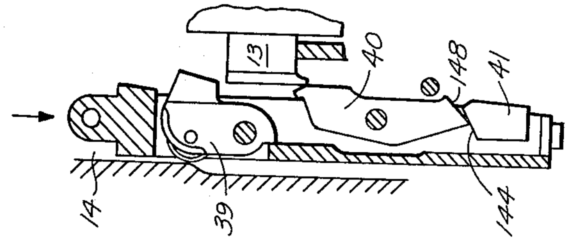

In FIG. 11, the pawl has been depressed by the missile shoe, but it will be noted that the pawl has not been thrown over-center. In FIG. 12, pivotal finger 39 is first striking the missile shoe and as previously noted, the finger mounts roller 46 which facilitates its pivoting movement by riding along an arcuately enlarged rear surface 162 of the rammer head chamber. FIG. 13 shows the pivoted position of the finger. In FIG. 14, the rammer head has been lowered to the full extent of its short stroke and the particular fact to be noted is that the pawl still has not been depressed over the cam center 147 so that the cam still is urging the pawl into an outwardly projected position.

Figure 16:
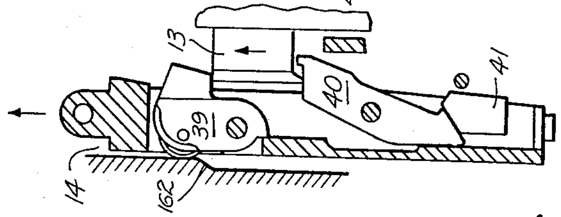
Figure 15:
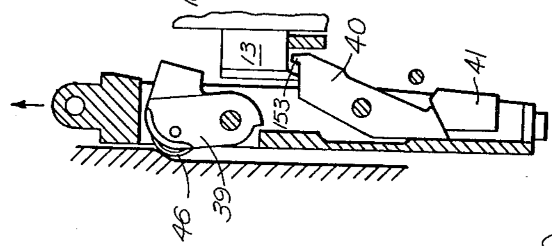

In FIG. 15, the rammer head had started its rise to pick up the missile and the pawl is shown as it first engages the missile shoe. In FIG. 16, the latching action of the rammer head has been completed. Pawl 40 has picked up and moved the missile shoe a fixed distance and, during this movement, rear roller 46 of the finger has ridden over rear curvature 162 of the missile magazine to again extend the finger into an outwardly projecting position in which it rides over the top of the missile shoe. Obviously, the missile shoe then is securely engaged and the remaining action is to complete the stroke of the rammer head to ram the missile through the blast door and completely onto the launcher arm rail from which it may be fired.

Figure 19A:
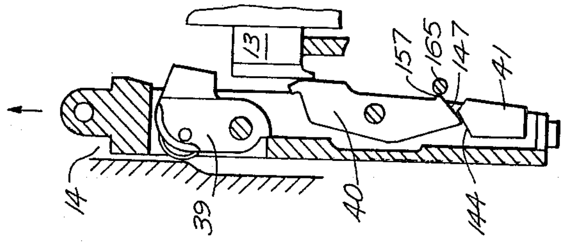
FIGS. 17–19*a* are similar schematics illustrating the action of the rammer head in which its latch is restrained for engaging and hoisting a missile.
Figure 19:
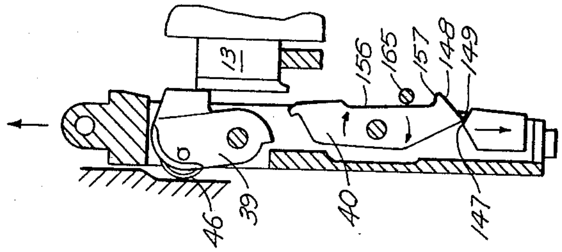
Figure 18:
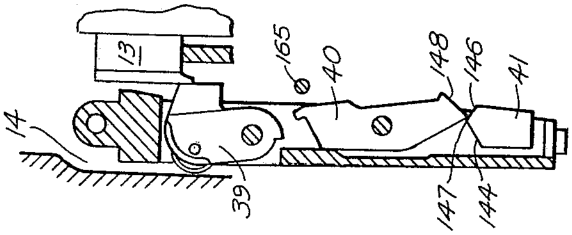
Figure 17:
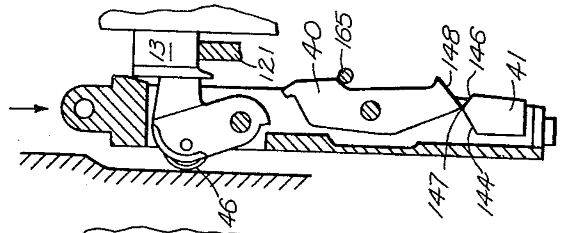

FIGS. 17–19 illustrate another manner in which the rammer head can act during a magazine loading operation which, as already stated, is an operation in which the rammer head is used to lower the missile into its magazine cell. Of course, the indexing of the rammer head, the blast door and the magazine rail is as before. In FIG. 17 the rammer head has carried the missile into a position in which its shoe rests upon support block 121 and, as will be apparent, the rammer head pawl 40 remains in its outwardly projecting position during most of this downward movement. However, prior to the initiation of this operation, the rammer head drive has been set for its long stroke so that rammer head then descends further in the missile magazine than it previously extended for a missile pick up operation. The length of the long stroke is somewhat critical at least to the extent that FIG. 17 shows the absolute upper limit of the long stroke. The limit is determined by the point at which the pawl is depressed over cam center 147. The mechanism producing the depression of the pawl is another cam in the form of a camming pin 165 which extends into rammer head chamber 14 of the missile cell rails in an appropriate position to contact the pawl. Preferably, this pin 165 is an eccentric pin so that it can be inserted in a bore in the magazine cell wall and then rotated after insertion to produce a fine adjustment conforming to the actual length of the rammer drive long stroke.

In FIG. 18, eccentric cam pin 165 has ridden against the inclined section 156 of the pawl to depress the pawl sufficiently to flip it over the cam center. Also, the rammer head has reached an end of its long downward stroke and is about to commence its upward movement. It will be seen in this figure that finger 39 also has been pivoted rearwardly by the missile shoe so as to ride over the shoe. In FIG. 19, the rammer head is moving upwardly and it will be noted that eccentric pin 165 is riding on surface 156 so that the rear end of the pawl now is being depressed to bring its lower edge 149 near edge portion 147 of the spring pressed cam.

Obviously, as the rammer head continues its upper movement the pawl is restrained by pin 165 in its depressed position until its missile engaging detent 153 has ridden beneath the rammer shoes. At this point, the function of its projection or ridge 157 becomes clear since this ridge then is engaged by eccentric pin 165 to depress the rear end of the pawl sufficiently to again cause the cam to snap over center into a position in which the pawl is spring pressed into its normal outward projection. Also, of course, upper finger 39 of the pawl pivots outwardly into its normal position.

The remaining actions taking place during the upward movement of the rammer head also will be self evident. In particular, after the pawl has cleared the rammer shoe it will spring into its normal outwardly projecting position. Of course, the purpose of the entire arrangement is to restrain the pawl in a nonoperative position so that the missile then is left in the missile cell. In this manner the long and short strokes of the rammer head drive cooperate with the particular rammer head of the chain hoist mechanism to accomplish all of the functions desired in the launching system mode of operation.

The advantage of the rammer head and its associated mechanisms will be self-apparent. Obviously, it is specially suited for a missile launcher having a missile magazine and launcher arm arrangement similar to that which has been considered. However, the rammer head proper is a unique arrangement of parts capable of accomplishing a remote pick up of a variety of relatively inaccessible objects. Also, its arrangement, in conjunction with its long and short extensions, is adaptable for other uses, and the particular provisions for braking, manual drive and latching should be found generally advantageous.

Obviously many modifications and variations of the present invention are possible in the light of the above teachings. It is therefore to be understood that within the scope of the appended claims the invention may be practiced otherwise than as specifically described.

What is claimed is:

1. Hoisting apparatus comprising a chain reel, a chain having one end wound on said reel, drive means for reciprocably extending and retracting the chain, means for regulating said drive for producing reciprocatory short and long strokes of varying lengths, a rammer head for engaging and hoisting an object during a chain retraction stroke, a stationary track for receiving and guiding said rammer head during its extension and retraction, and pin means carried by said track, said rammer head including an elongate body portion coupled at its rearward end to said chain, an elongate pawl member medially pivoted in the body portion and formed at its rearward end with a latching projection, and cam means engaging and pressing the pawl member's forward end inwardly toward said body to hold said latch projection outwardly of the body in operative hoisting disposition, said cam means being resiliently depressable for permitting said pawl member's rearward end to be depressed into a non-operative hoisting position, and said cam means having a triangular camming surface for permitting said pawl's forward end to pivotally swing over-center past its apex whereupon said cam resiliently pressures the forward end of the pawl outwardly of the body to hold the latch projection in its inwardly depressed non-operative hoisting position, said pin means being disposed for engaging and depressing said pawl into said non-operative position only when the rammer head is near the outer limit of extension in its long stroke.

2. The apparatus of claim 1 wherein said drive means includes an hydraulically-driven sprocket engaging and driving said chain, and said drive regulating means includes an hydraulically-actuated control mechanism for selectively and remotely limiting the rotational advance of said sprocket.

3. The apparatus of claim 1 further including a finger member pivotally mounted on said body between said pawl member and the rearward end of the body, said finger being freely pivotable and having a jaw portion adapted to project outwardly of the body portion for a cooperative hoisting engagement with said pawl.

4. The apparatus of claim 3 wherein said finger further has a surface opposite to said jaw formed with an arcuate curvature and adapted upon inward pivotal movement of said jaw to project outwardly of the body portion on the opposite side with respect to the jaw.

5. The apparatus of claim 4 further including a buffer member carried at the forward end of said body portion, and support and alignment rollers carried respectively at the sides and a rear surface of the body.

6. The apparatus of claim 1 wherein said drive means further includes an hydraulically driven sprocket engaging and driving said chain, an idler chain sprocket, and a brake member, said brake member including spring-pressured friction members, hydraulic means controllably offsetting the spring pressure, and gear means coupling said idler sprocket to said friction members, said friction members being arranged to provide a clutch when said hydraulic control is released, whereupon said gear train can be manually driven through said friction clutch for reciprocably stroking said rammer head.

7. The apparatus of claim 6 further including a latch normally urged into latching engagement with said idler sprocket, and hydraulic means for holding the latch in a non-operative position whereby release of hydraulic pressure permits said resiliently-urged latch to engage said idler.

8. The apparatus of claim 7 wherein said drive regulating means includes an hydraulically-actuated control mechanism for selectively and remotely limiting the rotational advance of said drive sprocket.

9. Hoisting apparatus for use with a guided missile launcher of a type having a missile magazine formed with a ring of missile cells having rail sections adapted to receive the missile launching shoes and support the missiles in a vertical disposition, pin means carried by each of said cell rail sections, said launcher further having a launcher arm provided with a rail section rotatable and elevatable by said arm into a vertically-aligned disposition relative to a magazine cell rail section whereupon a continuous track is formed for ramming the selected missile thereon; said hoisting apparatus comprising a chain reel carried by said arm, a chain having one end wound in said reel, chain-engaging drive and idler sprockets carried by the arm in position to lead said chain into said arm rail section, a rammer head carried by the other end of the chain and adapted to be reciprocably moved through said arm and cell rail sections, drive means for reciprocably extending and retracting the chain, means for regulating said drive for producing reciprocating short and long strokes of varying lengths, said rammer head including an elongate body portion coupled at its rearward end to said chain, an elongate pawl member medially pivoted in the body portion and formed at its rearward end with a latching projection, and cam means engaging and pressing the pawl member's forward end inwardly toward said body to hold said said latch projection outwardly of the body in operative hoisting disposition, said cam means being resiliently depressable for permitting said pawl member's rearward end to be depressed into a non-operative hoisting position, and said cam means having a triangular camming surface for permitting said pawl's forward end to pivotally swing over-center past its apex whereupon said cam resiliently pressures the forward end of the pawl outwardly of the body to hold the latch projection in its inwardly depressed non-operative hoisting position, said pin means being disposed for engaging and depressing said pawl into said non-operative position only when the rammer head is near the outer limit of its long stroke.

10. The apparatus of claim 9 wherein said drive regulating means includes an hydraulically-actuated control mechanism for selectively and remotely limiting the rotational advance of said drive sprocket.

11. The apparatus of claim 10 further including a finger member pivotally mounted on said body between said pawl member and the rearward end of the body, said finger being freely pivotable and having a jaw portion adapted to project outwardly of the body portion for a cooperative hoisting engagement with said pawl.

12. The apparatus of claim 10 further including a brake member mounted on said arm, said brake member including spring-pressured friction members, hydraulic means controllably offsetting the spring pressure, and gear means coupling said idler sprocket to said friction members, said friction members being arranged to provide a clutch when said hydraulic control is released, whereupon said gear train can be manually driven through said friction clutch for reciprocably stroking said rammer head.

13. The apparatus of claim 12 further including a latch carried by said arm and normally urged into latching engagement with said idler sprocket, and including hydraulic means for holding the latch in a non-operative position whereby release of hydraulic pressure permits said resiliently-urged latch to engage said idler.

14. The apparatus of claim 1 wherein said pawl has its rearward end shaped to re-engage said pin means during a retraction movement of said long stroke, said re-engagement depressing said rearward end for pivoting the pawl into said operative position.

References Cited in the file of this patent

UNITED STATES PATENTS

| | | |
|---|---|---|
| 2,701,736 | Heppenstall | Feb. 8, 1955 |
| 2,985,072 | Carlberg et al. | May 23, 1961 |

FOREIGN PATENTS

| | | |
|---|---|---|
| 10,849 | Great Britain | 1911 |